June 24, 1969 A. F. BEALE, JR., ETAL 3,452,097
FRACTIONATION OF POLYAMINES
Filed Feb. 23, 1967 Sheet 1 of 2

INVENTORS.
Alvin F. Beale, Jr.
BY Luke W. Donnell

Griswold & Burdick
ATTORNEYS

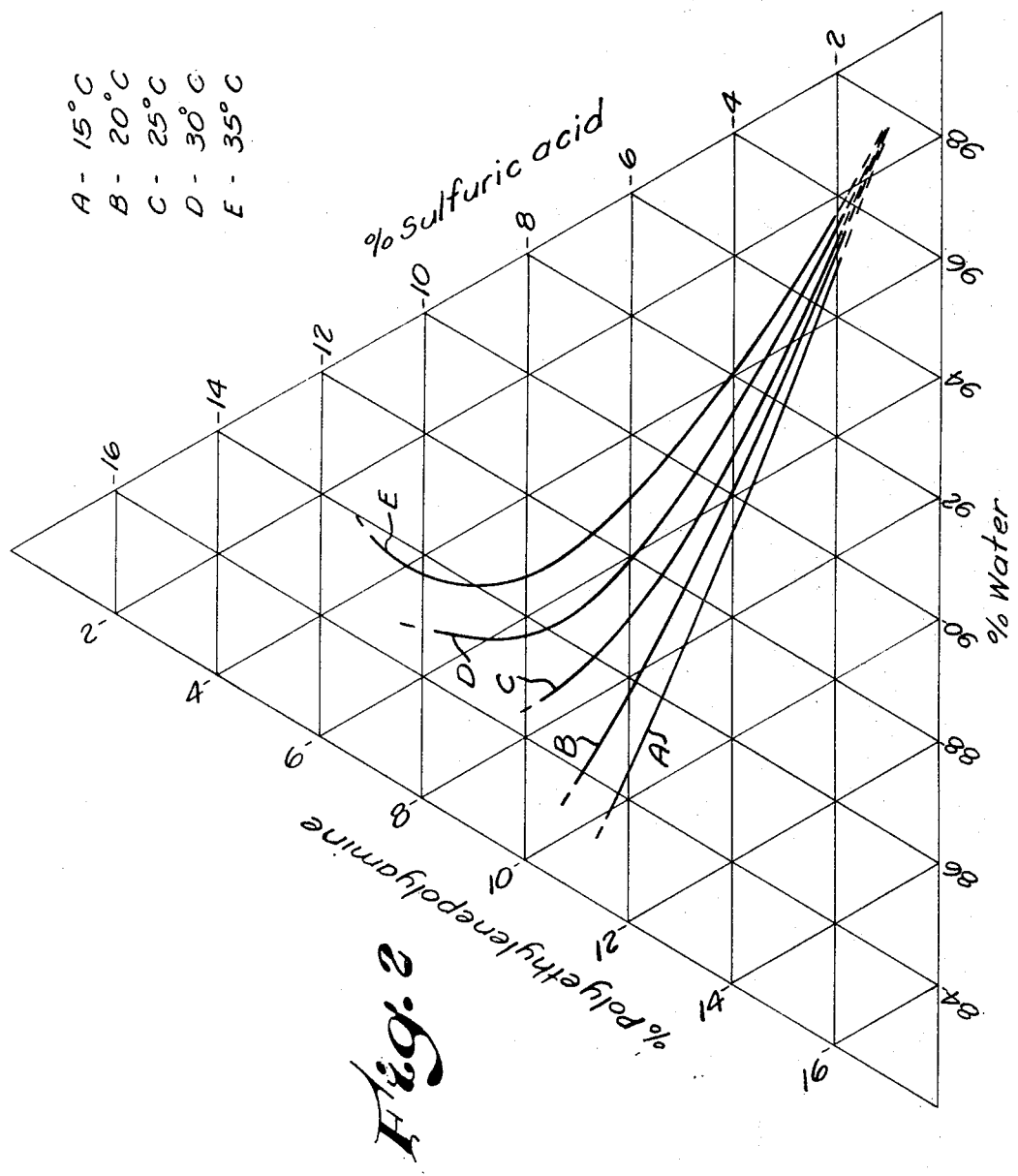

United States Patent Office 3,452,097
Patented June 24, 1969

3,452,097
FRACTIONATION OF POLYAMINES
Alvin F. Beale, Jr., and Luke W. Donnell, Lake Jackson, Tex., assignors to The Dow Chemical Company, Midland, Mich., a corporation of Delaware
Filed Feb. 23, 1967, Ser. No. 618,078
Int. Cl. C07c 87/00; B01d 11/00; C07b 29/00
U.S. Cl. 260—583                                6 Claims

ABSTRACT OF THE DISCLOSURE

A polyamine mixture of relatively high molecular weight such as a polyalkylenimine or a polyalkylenepolyamine is separated into fractions of different average molecular weights by contacting the polyamine with aqueous sulfuric acid. A phase separation is thereby obtained wherein polyamines of lower molecular weight are concentrated in a water-rich phase and polyamines of higher molecular weight are concentrated in a polyamine-rich phase.

---

Background of the invention

The present invention relates to a method whereby polymerized alkylenimines and polyalkylenepolyamines are separated into fractions of higher and lower average molecular weights. It relates particularly to a process for separating such polyamines into fractions of different average molecular weights.

It is known generally that different molecular species such as aromatic and aliphatic hydrocarbons can often be separated by taking advantage of their different solubilities in a particular solvent. It is also known that ordinarily the solubility of a polymeric material decreases as its molecular weight increases. In some cases, material of lower molecular weight can be leached from a polymer by selective solvent extraction to obtain a polymer of higher average molecular weight.

Polymerized alkylenimines and the structurally closely related polyalkylenepolyamines are polymers whose molecular structures contain as the principal repeating unit the moiety —$C_nH_{2n}NH$— wherein $n$ is an integer from 2 to about 4. The nitrogen atoms in these structures are largely secondary, but it is known that significant proportions of both primary and tertiary amino nitrogen atoms are present, indicating some branching of the polymer chain. These polymers are generally easily dissolved in water and aqueous acids and one of their major uses is as flocculating and settling agents for treating aqueous suspensions such as sewage, paper pulp suspensions, waste water, and the like. As usually prepared, such polyamines are mixtures of molecules covering a broad range of molecular weight. For many purposes, the polyamines of relatively high molecular weight have the most desirable properties for uses such as those listed above. However, no economically practical method has been available in the past to provide polyamine fractions of a relatively narrow molecular weight range.

Summary of the invention

It has now been found that a polyamine such as described having an average mlecular weight of at least 1000 is separated into coexisting water-rich and polyamine-rich phases when intimately contacted with 4–100 parts by weight of aqueous sulfuric acid of 1–30 percent by weight concentration. It has been found also that the polyamines dissolved in the water-rich phase are largely those polyamines of relatively low molecular weight while the polyamine-rich phase is essentially a solution in more concentrated aqueous sulfuric acid of the polyamines of higher molecular weight. By repeating the process, the concentration of the higher molecular weight polyamines and, consequently, the average molecular weight of the polyamines, in the amine layer can be successively increased as the lower molecular weight polyamines are progressively extracted. The process can be operated at any temperature between the freezing point of the aqueous acid-polyamine system and about 60° C. By this process, the original polyamine can be separated into as many fractions as desired of low, intermediate, and high average molecular weight. Fractions of uniform average molecular weight and relatively free of other molecular weight species are thereby obtainable.

Brief description of the drawings

FIGURE 2 is a similar graph for the system wherein the polyamine is the polyethylenepolyamine of Example 3. In this case, the lower limit of sulfuric acid concentration for phase separation varies somewhat with the temperature. Example 5 describes the procedure by which the data for this graph was obtained.

Detailed description

Figure 1:
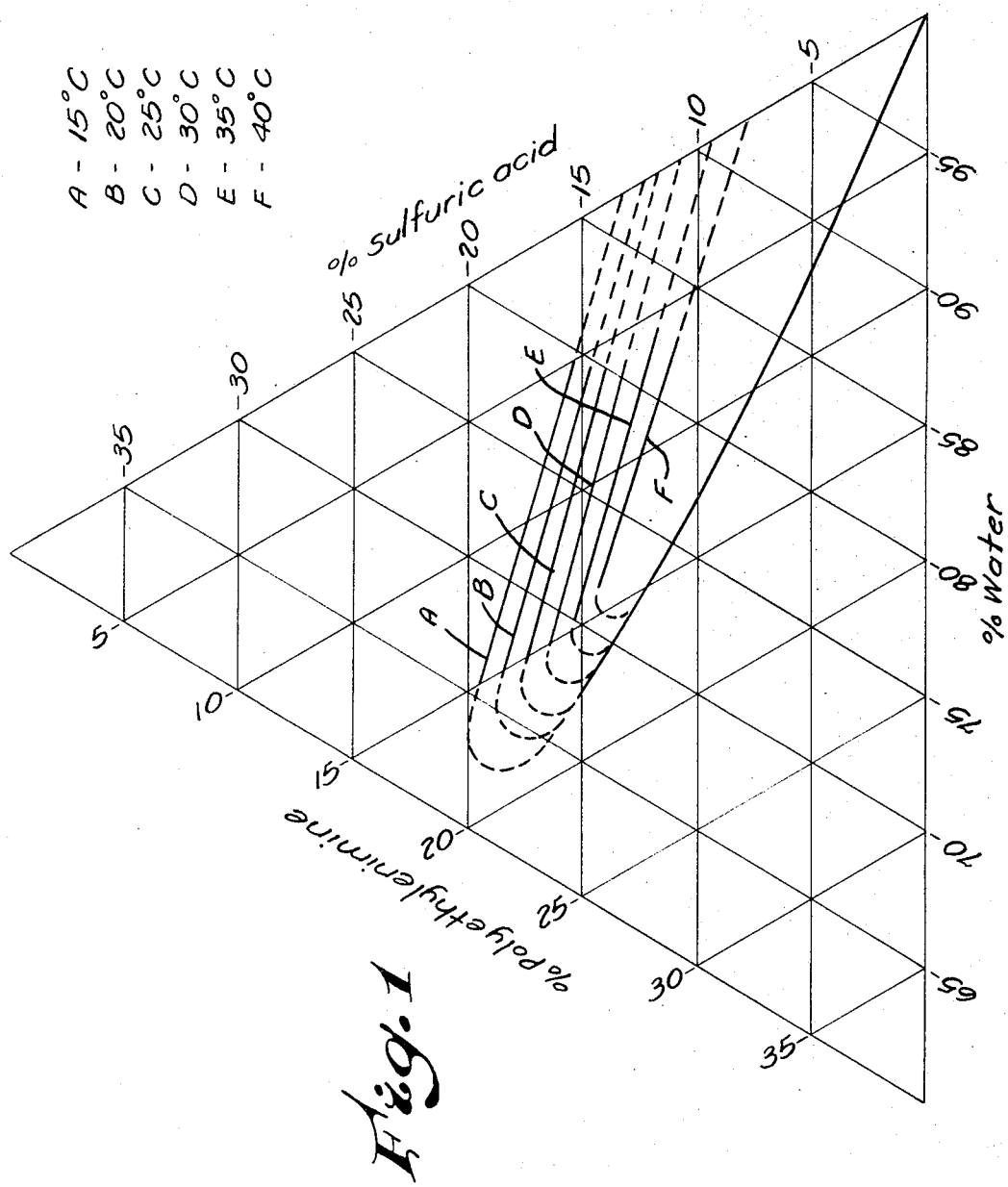
FIGURE 1 is a graphical representation of the area of composition of the three component system polyethylenimine-water-sulfuric acid where the system exists as two distinct phases. Proportions of the components are given in weight percent of the total. The upper lines A, B, C, D, E, and F represent respectively the limits of the two-phase area at higher sulfuric acid concentrations at temperatures from 15° C. to 40° C. in five degree increments. The line defining the lower limit of sulfuric acid concentration for the two-phase area is common to all temperatures tested, at least within the limits of the figure. It is seen that, as might be expected, the area of composition wherein two phases exist decreases with increasing temperature. A description of the method by which the graph was developed is found in Example 2.

The present process is applicable to polyalkylenimines and polyalkylenepolyamines wherein the alkylene groups are of 2–4 carbon atoms as previously defined and the average molecular weight is at least 1000 and preferably from 2000 to 1,000,000. By the term polyalkylenimines is meant homopolymers of vicinal alkylenimines such as ethylenimine, propylenimine, and butylenimine. By the term polyalkylenepolyamines is meant the corresponding polymers based on alkylene diamines such as ethylene diamine, propylene diamine and the like which are obtained as higher molecular weight products of the reaction of an alkylene dichloride with ammonia or with a corresponding or homologous alkylene diamine or lower polymer thereof. In both the polyalkylenimines and polyalkylenepolyamines as defined above, more than one species of alkylene radical may be present in the same polyamine molecule. Preferably, the alkylene radical is ethylene in each case. Best results are obtained and it is preferred to operate with polyalkylenimines, particular polyethylenimine, as the polyamine.

The process is operable at moderate temperatures as previously defined. Preferably, a temperature at or near ambient temperature is employed, for example, 10–50° C.

Surprisingly, only sulfuric acid has been found to give practical separations as the acid component. Other aqueous mineral acids such as hydrochloric, phosphoric, nitric, and perchloric acids which might be expected to be similar in their action to sulfuric acid are ineffective in the process.

The process can be operated also as an essentially continuous countercurrent extraction by first forming a two phase system and contacting the heavy amine phase with either the further diluted aqueous phase or fresh dilute aqueous sulfuric acid. Either or both of the amine-rich phase and the water-rich phase can be recycled in such a procedure in which conventional countercurrent extraction equipment is suitable. By repeated extractions of the amine-rich phase, the polyamine content thereof becomes a concentrate of the higher molecular weight polyamines containing little or none of the lower and intermediate fractions. Alternatively, light and intermediate fractions can be obtained by similar treatment of the aqueous phase. The polyamine fractions are obtained by this process as solutions in aqueous sulfuric acid wherein the polyamine is present essentially as an amine sulfate. For some purposes, these solutions can be used as such or after neutralization of the acid. The polyamine can be isolated by conventional means, if desired. For example, the solution can be neutralized, filtered to remove the acid salt, and the filtrate evaporated under reduced pressure to eliminate water.

Example 1

A sample of polyethylenimine containing a wide range of molecular weight species as shown in Table II was stirred with aqueous sulfuric acid at 25° C., thereby forming a lower organic layer containing most of the polymer and an upper water-rich layer. The lower layer was separated and sufficient water was added to it to obtain about the original aqueous sulfuric acid concentration of 8 percent, thereby causing a second two-phase system to form. The lower polymer layer was again separated, diluted with water as before, and a third polymer layer was obtained which was found to contain most of the higher molecular weight polyethylenimine and little of the lowers. Values found in this molecular weight fractionation, based on 100 g. of starting polyethylenimine, and molecular weight distribution of some separated fractions are shown in the following tables.

furic acid of known concentration. When the solution became opaque, indicating the formation of two phases, the temperature was raised to 20° C. whereupon a homogeneous solution was again obtained, and the titration was continued to opaqueness as before. Upon titration to the formation of two phases at 40° C., the process was reversed, that is, the solution was cooled and additional sulfuric acid added to the disappearance of opaqueness in steps of five degrees to a final temperature of 15° C. The points at which two phases formed or disappeared at each temperature where connected to give the curves shown in the drawing. Those curves, therefore, define the areas of composition where two phases coexist at the various temperatures tested.

Similar areas of phase separation were found for another sample of polyethylenimine and for samples of polyalkylenepolyamines such as that of Example 3.

Example 3

A sample of polyethylenepolyamine consisted of molecules within a molecular weight range of about 5,000–500,000 with peaks of concentration at about the opposite ends of this range. This material had been made by reacting crude pentaethylenehexamine with 1.3 moles of ethylene dichloride and about 0.9 mole of dilute aqueous sodium hydroxide at 120° C. A sample was mixed with 19 parts by weight of 5.3 percent aqueous sulfuric acid at 25° C. Two phases were obtained, an upper layer consisting of 3.2 percent polyethylenepolyamine, 4.0 percent sulfuric acid, and 92.7 percent water and a lower layer containing 11.1 percent polyethylenepolyamine. The polyamine in the upper layer was primarily within the molecular weight range of 5,000–20,000 while that in the lower layer contained most of the higher molecular weight fraction of the starting material. Further extractive separation

TABLE I

| Component | Total | First separation | | Second separation | | Third separation | |
|---|---|---|---|---|---|---|---|
| | | Upper layer | Lower layer | Upper layer | Lower layer | Upper layer | Lower layer |
| Polyethylenimine, grams | 100 | 22 | 78 | 4.7 | 73.3 | 3 | 70.3 |
| H₂SO₄, grams | 120 | ¹ (36) | 84 | ¹ (17) | 67 | ¹ (3) | 64 |
| Water, grams | 1,380 | ¹ (1,150) | 230 | ² (740) | 190 | ³ (615) | 175 |

¹ By difference.
² 700 g. of water were added to the lower layer from the first separation.
³ 600 g. of water were added to the lower layer from the second separation.

Table II shows the molecular weight distribution present in the starting polyethylenimine and in polyethylenimine fractions from the separation outlined in Example 1 and Table I above. Molecular weight ranges were estimated for the samples on the basis of molecular size determination obtained by separating the samples into aqueous fractions of different molecular size by gel permeation chromatography and analyzing these aqueous solutions for organic carbon content. Proportions are expressed in weight percent.

TABLE II

| Molecular weight range | Original polymer | Upper layer first sep'n. | Lower layer second sep'n. |
|---|---|---|---|
| Above 500,000 | 27.9 | 2.8 | 56 |
| 100,000–500,000 | 14.2 | 7.5 | 18 |
| 10,000–100,000 | 26.5 | 61.4 | 26 |
| Below 10,000 | 31.4 | 28.3 | 0 |

The high molecular weight polyethylenimine contained in the lower layer from the third separation (Table II) was isolated and found to be a hygroscopic solid. A 27.5 percent by weight solution in water was barely pourable. This material was found to be superior to the original polyethylenimine as a dewatering agent for wood pulp and digested sludge.

Example 2

In order to construct the phase diagram for polyethylenimine at temperatures of 15–40° C. as shown in FIGURE 1, the following procedure was employed. A weighed quantity of the polyethylenimine starting material of Example 1 was titrated at 15° C. with dilute aqueous sulwith aqueous sulfuric acid as in Example 1 yielded fractions progressively more concentrated in respect to higher and lower molecular weight species.

Example 4

Another sample of polyethylenepolyamine similar to the polyamine employed in Example 3 was mixed with aqueous sulfuric acid at room temperature in polyamine:water:sulfuric acid weight ratios of 5.03:87.3:7.67. The lower layer of the two-phase system thereby formed contained 30 percent of the original polyamine in the form of the higher molecular weight fractions. This material was separated and was found to be superior to the starting polyamine as a flocculant when applied to suspensions of clay, starch, and raw sewage. The upper layer from the above two-phase system was further diluted with 10% sulfuric acid to obtain another lower layer which was essentially polyamines of intermediate molecular weight and relatively free of the lowest molecular weight materials. This second lower layer polyamine was also superior to the original polyamine in flocculating raw sewage.

Example 5

The phase diagram of FIGURE 2 was constructed from data obtained by the general procedure described in Example 2. The polyethylenepolyamine was that for which the preparation is shown in Example 3. A weighed quantity of 20% aqueous polyamine was titrated with 10% aqueous sulfuric acid at 15° C. until the mixture became opaque, indicating separation of two phases. The system was then warmed to 20° C. at which temperature it again became a clear solution. The solution was further titrated at 20° C. with 10% aqueous sulfuric acid to opacity. The process was repeated at five degree intervals to 35° C.

We claim:
1. A process for separating a polyamine into fractions of different average molecular weights, said polyamine being a polymerized alkylenimine or a polyalkylenepolyamine and having a molecular structure containing as the principal repeating unit thereof the moiety —$C_nH_{2n}NH$— whenein $n$ is an integer from 2 to 4 and wherein $n$ can have more than one value in the same molecule, said polyamine having an average molecular weight of at least 1000, which process comprises intimately contacting said polyamine with 4–100 parts by weight of 1–30 percent aqueous sulfuric acid at a temperature from the freezing point of the polyamine-aqueous sulfuric acid mixture thereby formed to about 60° C., whereby there is formed a two-phase system having an upper water-rich layer containing a polyamine fraction of relatively low molecular weight and a lower polyamine-rich layer containing a polyamine fraction of relatively high molecular weight, and separating said layers.

2. The process of claim 1 wherein the polyamine is polyethylenimine.

3. The process of claim 1 wherein the polyamine is a polyethylenepolyamine.

4. The process of claim 1 wherein the temperature is 10–50° C.

5. The process of claim 1 wherein the separated lower polyamine-rich layer is diluted with sufficient water to cause formation of a second two-phase system having a second upper water-rich layer containing a second polyamine fraction of relatively low molecular weight and a second lower polyamine-rich layer containing a second polyamine fraction of relatively high molecular weight, and separating said second layers.

6. The process of claim 1 wherein the aqueous sulfuric acid is of about 5–10 percent concentration.

References Cited

UNITED STATES PATENTS 3,038,904  6/1962  Godfrey.

CHARLES B. PARKER, *Primary Examiner.*

R. L. RAYMOND, *Assistant Examiner.*

U.S. Cl. X.R.

260—582, 703, 705